US011550555B2

(12) United States Patent
Barrett et al.

(10) Patent No.: US 11,550,555 B2
(45) Date of Patent: Jan. 10, 2023

(54) DEPENDENCY-BASED AUTOMATED DATA RESTATEMENT

(71) Applicant: MICROSOFT TECHNOLOGY LICENSING, LLC, Redmond, WA (US)

(72) Inventors: Christopher W. Barrett, Seattle, WA (US); Chen Wang, Sammamish, WA (US); Maurizio Bruno Di Gianluca, Bellevue, WA (US); Shalini Balasubramonian, Kirkland, WA (US); Jack Miele Pullikottil, Redmond, WA (US); Mohit Tandon, Bellevue, WA (US); Srisaipavan Valluri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/307,399

(22) Filed: May 4, 2021

(65) Prior Publication Data

US 2022/0357932 A1 Nov. 10, 2022

(51) Int. Cl.
*G06F 9/44* (2018.01)
*G06F 8/41* (2018.01)

(52) U.S. Cl.
CPC .................................. *G06F 8/433* (2013.01)

(58) Field of Classification Search
CPC ...................................................... G06F 8/433
USPC ...................................................... 717/155
See application file for complete search history.

(56) References Cited

U.S. PATENT DOCUMENTS

| 6,898,560 | B1 | 5/2005 | Das |
| 8,812,752 | B1* | 8/2014 | Shih ........................ G06F 9/542 |
| | | | 717/109 |
| 9,092,482 | B2* | 7/2015 | Harris ............... G06F 16/24542 |
| 9,229,952 | B1* | 1/2016 | Meacham ........... G06F 16/1873 |
| 10,031,775 | B2* | 7/2018 | Modani ................. G06F 9/4881 |
| 10,037,187 | B2* | 7/2018 | Akidau ..................... G06F 7/00 |
| 10,209,963 | B2* | 2/2019 | Hutchison ............. G06F 3/0673 |
| 10,331,632 | B2 | 6/2019 | Karras et al. |

(Continued)

OTHER PUBLICATIONS

Sherif Sakr et al. "Linked Data: Storing, Querying, and Reasoning"; Springer, 2018.*

(Continued)

*Primary Examiner* — Francisco J Aponte
(74) *Attorney, Agent, or Firm* — NovoTechIP International PLLC

(57) ABSTRACT

A method for providing automatic restatement of a data environment includes receiving a request for restatement of a first dataset, accessing dependency data that describes a set of dependencies between the first dataset and one or more other datasets in the computer data environment, examining the dependency data to automatically identify one or more second dataset from among the one or more other datasets, the second datasets being datasets from which the first dataset depends, examining a first timing data related to the restatement of the first dataset and a second timing data related to the restatement of the identified second datasets to identify one or more third datasets from among the second datasets that require restatement as a result of the restatement of the first dataset, generating a restatement plan based on the identified third datasets, and initiating automatic execution of the restatement plan.

20 Claims, 8 Drawing Sheets

(56) References Cited

U.S. PATENT DOCUMENTS

| | | | | |
|---|---|---|---|---|
| 10,732,928 | B1* | 8/2020 | Akidau | G06F 7/00 |
| 10,956,508 | B2* | 3/2021 | Maclean | G06T 11/206 |
| 11,003,645 | B1* | 5/2021 | Thompson | G06F 16/906 |
| 11,068,306 | B2* | 7/2021 | Vadapandeshwara | |
| | | | | G06F 3/0673 |
| 11,176,175 | B1* | 11/2021 | Snyder | G06F 16/283 |
| 11,288,094 | B2* | 3/2022 | Tao | H04L 67/61 |
| 11,314,572 | B1* | 4/2022 | Avner | G06F 11/0751 |
| 11,336,714 | B1* | 5/2022 | Liu | H04L 67/10 |
| 2014/0081685 | A1* | 3/2014 | Thacker | G06F 16/2379 |
| | | | | 705/7.12 |
| 2017/0006135 | A1* | 1/2017 | Siebel | G06N 20/00 |
| 2017/0139952 | A1* | 5/2017 | Arasan | G06F 16/164 |
| 2019/0114289 | A1* | 4/2019 | Dang | G06F 16/2365 |
| 2022/0284057 | A1* | 9/2022 | Deutsch | G06F 16/9024 |

OTHER PUBLICATIONS

"The Graph Database Advantage for Enterprise Architects", Retrieved from: https://web.archive.org/web/20190302052814/https://www.avolutionsoftware.com/abacus/the-graph-database-advantage-for-enterprise-architects/, Mar. 2, 2019, 04 Pages.

Catrinescu, Vlad, "70-475 Study Guide: Designing and Implementing Big Data Analytics Solutions", Retrieved from: https://web.archive.org/web/20200812010342/https:/vladtalkstech.com/70-475-study-guide-designing-implementing-big-data-analytics-solutions, Aug. 12, 2020, 09 Pages.

Goyal, et al., "Real-Time Data Lineage at UBS", Retrieved from: https://neo4j.com/blog/real-time-data-lineage-ubs/, Apr. 11, 2019, 21 Pages.

Khil, et al., "Graph-Based Analysis of the Architectural Restructuring Impact on Energy Efficiency", In Proceedings of the Fourteenth International Conference on Software Engineering Advances, Nov. 24, 2019, pp. 163-170.

Talleras, Kim, "From Many Records to One Graph: Heterogeneity Conflicts in the Linked Data Restructuring Cycle", In Proceedings of the Eighth International Conference on Conceptions of Library and Information Science, Aug. 19, 2013, 15 Pages.

"International Search Report and Written Opinion Issued in PCT Application No. PCT/US22/024137", dated Jul. 11, 2022, 12 Pages.

\* cited by examiner

DEPENDENCY-BASED AUTOMATED DATA RESTATEMENT

TECHNICAL FIELD

This disclosure relates generally to restatement of data and, more particularly, to an improved method of and system for automatic data restatement based on dataset dependencies.

BACKGROUND

In recent years, data has become an important aspect of various software programs' feature development, reliability, tracking, product production and many more fields. The amount of data collected, stored, utilized and/or analyzed in these fields is often significantly large and may include many different datasets. To create a dataset, a variety of complex transformations and validations of incoming raw data streams may be performed. The data streams are often provided by other datasets. As such, a dataset may depend on multiple other datasets. As the number of datasets and dependencies between them increases, management of data becomes more complex.

One of the complexities of managing a large data storage environment is handling data restatements. Restatement of data occurs, when one or more data streams or datasets are reprocessed (e.g., reproduced) for a given time period of data. Restatement may be needed when data is updated, a failure occurs, and/or data inaccuracies are detected. When datasets depend on one another, however, a restatement in one dataset may affect its dependent datasets. In a large and complex data environment, this may result in numerous other restatements being needed. However, it is not easy for engineering teams to determine which datasets require restatement, as determining dependencies in a complicated data environment is a complex, time consuming and error prone task. The process often involves making inquiries to multiple different engineering teams (e.g., teams responsible for different datasets), collecting information from the various teams and attempting to determine dependencies for numerous datasets based on the information provided. This may become inefficient and time consuming and often beyond the ability of a human being. As a result, required restatements may be overlooked, some datasets may be restated multiple times and the process make take a significant amount of time and computing resources.

Hence, there is a need for improved systems and methods for automatic data restatement based on dataset dependencies.

SUMMARY

In one general aspect, the instant disclosure describes a data processing system having a processor, and a memory in communication with the processor where the memory comprises executable instructions that, when executed by the processor, cause the data processing system to perform multiple functions. The functions may include receiving, by a restatement server, a request for a restatement of a first dataset, the first dataset being a part of a data environment that includes a plurality of datasets, at least one of the plurality of datasets being dependent on one or more additional datasets in the data environment, accessing dependency data that describes a set of dependencies between the first dataset and one or more other datasets in the data environment, the dependency data including metadata associated with one or more of the plurality of datasets, analyzing the dependency data to automatically identify one or more second datasets from among the one or more other datasets, the one or more second datasets being datasets which depend from the first dataset, examining a first timing data related to the restatement of the first dataset and a second timing data related to the identified one or more second datasets to identify one or more third datasets that require restatement as a result of the restatement of the first dataset, the one or more third datasets being from among the one or more second datasets, generating a restatement plan based on at least a dependency relationship between the identified one or more third datasets, and initiating automatic execution of the restatement plan.

In yet another general aspect, the instant disclosure describes a method for providing automatic restatement of a data environment, where the method includes the steps of receiving, by a restatement server, a request for a restatement of a first dataset, the first dataset being a part of the data environment that includes a plurality of datasets, at least one of the plurality of datasets being dependent on one or more additional datasets in the data environment, accessing dependency data that describes a set of dependencies between the first dataset and one or more other datasets in the data environment, the dependency data including metadata associated with one or more of the plurality of datasets, analyzing the dependency data to automatically identify one or more second datasets from among the one or more other datasets, the one or more second datasets being datasets which depend from the first dataset, examining a first timing data related to the restatement of the first dataset and a second timing data related to the identified one or more second datasets to identify one or more third datasets that require restatement as a result of the restatement of the first dataset, the one or more third datasets being from among the one or more second datasets, generating a restatement plan based on at least a dependency relationship between the identified one or more third datasets, and initiating automatic execution of the restatement plan.

In a further general aspect, the instant disclosure describes a non-transitory computer readable medium on which are stored instructions that when executed cause a programmable device to receive, by a restatement server, a request for a restatement of a first dataset, the first dataset being a part of a data environment that includes a plurality of datasets, at least one of the plurality of datasets being dependent on one or more additional datasets in the data environment, access dependency data that describes a set of dependencies between the first dataset and one or more other datasets in the data environment, the dependency data including metadata associated with one or more of the plurality of datasets, analyze the dependency data to automatically identify one or more second datasets from among the one or more other datasets, the one or more second datasets being datasets which depend from the first dataset, examine a first timing data related to the restatement of the first dataset and a second timing data related to the identified one or more second datasets to identify one or more third datasets that require restatement as a result of the restatement of the first dataset, the one or more third datasets being from among the one or more second datasets, generate a restatement plan based on at least a dependency relationship between the identified one or more third datasets, and initiate automatic execution of the restatement plan.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
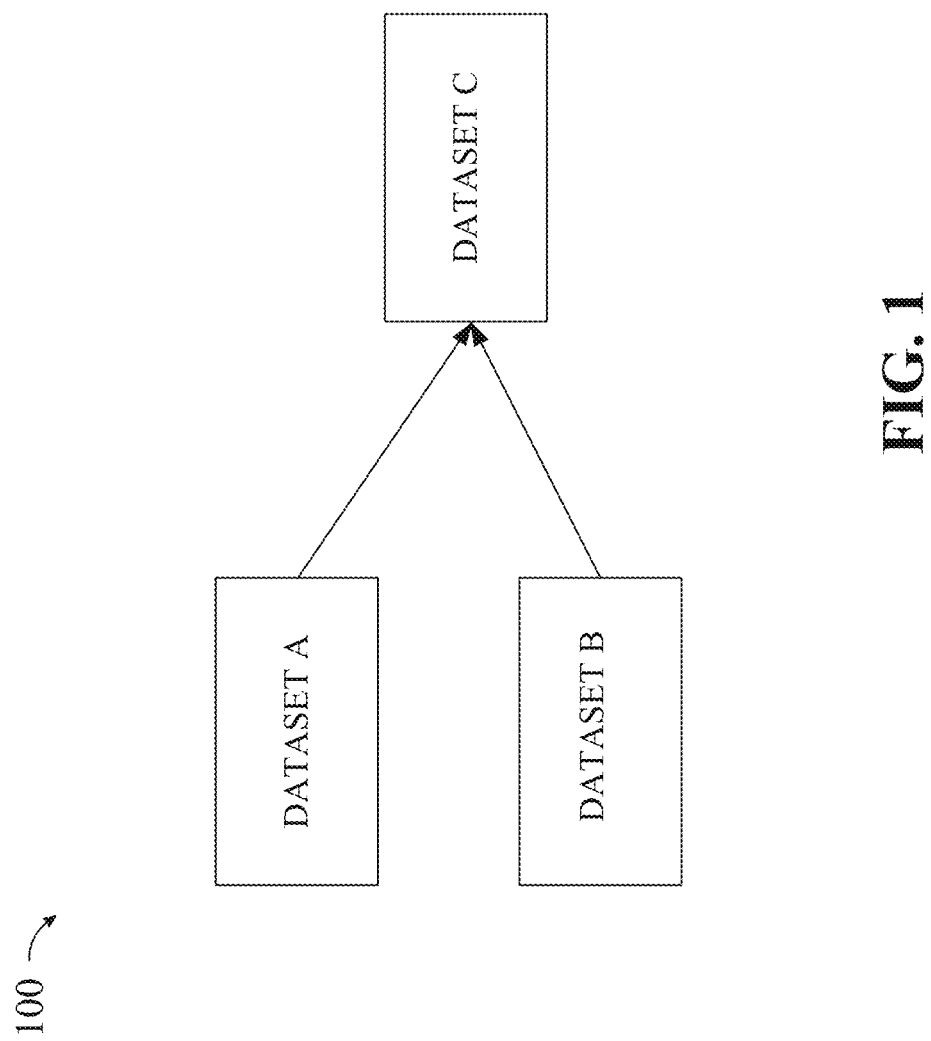
FIG. 1 depicts an example data environment upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Most enterprises monitor the operation of their computer systems and data environments to ensure system reliability and availability. This may be achieved by running various tests and/or utilizing monitoring tools that detect system or data issues (e.g., failures or erroneous behavior). When a failure or erroneous behavior is detected or an update to a dataset is determined to be needed, the dataset may require restatement to resolve the issue. In a large or complex data environment, when multiple datasets depend on one another, restatement of one dataset often necessitates restating many more datasets. This is particularly true when there are interdependencies between different datasets. To determine which datasets are affected by the restatement of a given dataset, the full dependency tree of the restated datasets may need to be determined. However, determining the full dependency tree of a given dataset is a complicated task and often beyond the ability of humans.

To make matters worse, different engineering teams are often responsible for different systems and datasets. As a result, determining how a restatement affects other datasets may require input from various different engineering teams. This can be a time consuming and error prone process, as it may involve teamwork from many different teams. Furthermore, different teams may take different amounts of times to respond. As a result, some datasets may be overlooked, and other datasets may require multiple restatements. The process is made even more complex, when time sensitivity of datasets is considered. That is because to accurately determine data dependence, the time a dataset is generated and what time period of data it consumes from other datasets to generate its data should be taken into account. This adds another level of complexity to the analysis which makes the process of identifying required restatements even more challenging. Thus, there exists a technical problem of inability of current systems to manage data restatements in a data environment time in an efficient, reliable and accurate manner which is time and resource efficient.

To address these technical problems and more, in an example, this description provides a technical solution of providing automatic restatement of data based on dataset dependencies. To achieve this, a mechanism may be used to determine that a given dataset has been restated, automatically identify other datasets which need restatement as a result, and create an optimized restatement operation plan for the required restatements. To achieve this, the full dependency tree of the given dataset may first be generated to identify datasets that depend on the restated dataset. The time period for which the given dataset was restated may also be considered in identifying datasets that consume data from that time period of the given dataset. The dependency tree and time information is taken into account to create an optimal restatement plan that includes datasets that need to be restated as well as a sequencing order for the restatements, such that each dataset is restated at an appropriate time and no more than once. The technical solution may take into consideration that dependencies are across multiple teams for multiple sources and/or intertwined dependency trees and calculate an accurate restatement plan automatically.

As will be understood by persons of skill in the art upon reading this disclosure, benefits and advantages provided by such technical solutions can include, but are not limited to, a solution to the technical problems of having inefficient, redundant, time-consuming, error prone and difficult to implement data restatements in complex data and computing system environments. Technical solutions and implementations provided herein optimize and improve the process of restating data in complex data and computing system environments by automatically generating and/or executing an optimized restatement plan. To ensure accurate identification of datasets requiring restatements, the technical solutions and implementations provided herein may take into account date/time of data generation as well as time periods for which data is consumed, thus increasing reliability, accuracy and system health. The benefits provided by these technology-based solutions include providing increased user and system efficiency.

As used herein, the term "restatement" may refer to reprocessing of one or more portions of data and is sometimes referred to in the art as "backfill". Moreover, the term "dependent" may be used to refer to a dataset or system which receives and uses a data stream from another dataset or system to generate its own data stream or output. Furthermore, as used herein, the term "dependency tree" or "lineage" may be used to refer to a set of dependencies between different datasets. The term "downstream" may be used to refer to a dataset that is dependent on another dataset.

The term "upstream," on the other hand, may refer to a dataset on which another dataset depends.

FIG. 1 depicts an example simplified dataset environment 100 upon which aspects of this disclosure may be implemented. The environment 100 is a simplified environment which includes only 3 different datasets identified as Dataset A, Dataset B, Dataset C. As illustrated, Dataset C in the environment 100 depends on both datasets A and B. This means that to generate Dataset C, data may need to be received from both Datasets A and B. Thus, Dataset C may not be produced until both Datasets A and B have been generated. For simple data generation, this may be a simple process, as even if a system attempts to generate Dataset C first, the attempt may not be successful until both Datasets A and B are ready. However, if one of the Datasets A or B are restated for a given time period, action must be taken to ensure that Dataset C is also restated for the given time and that the process occurs after the upstream dataset (e.g., Dataset A or B) has been restated. That is because while Datasets A or B are being restated, data from the previous versions of Dataset A and B is available and may be used to regenerate Dataset C. If Dataset C is reproduced before regenerating Dataset A, the restatement of Dataset C may not have been performed correctly, since incorrect data of Dataset A may have been used. To avoid this issue, the instant disclosure considers the timing of data generation and sequencing of restatements in processing restatements.

Restatements can be caused for many reasons. One of the common reasons for requiring restatement is existence of incorrect data in a dataset. For example, if a mistake in a logic that produces dataset A is detected, the engineering team may decide to correct the logic and regenerate the affected time periods of data for Dataset A to ensure accuracy. However, because data from the previous Dataset A was used to produce Dataset C, Dataset C may also be considered incorrect and as such may need to be regenerated. For a simple data environment, such as the environment 100, this may be achieved by identifying the time period for which Dataset A is being restated, determining which portions of Dataset C utilize data from the affected time period of Dataset A, and restating those portions of Dataset C, once Dataset A has been restated. As data environments get larger and more complex, this process becomes more and more complicated.

Figure 2A:
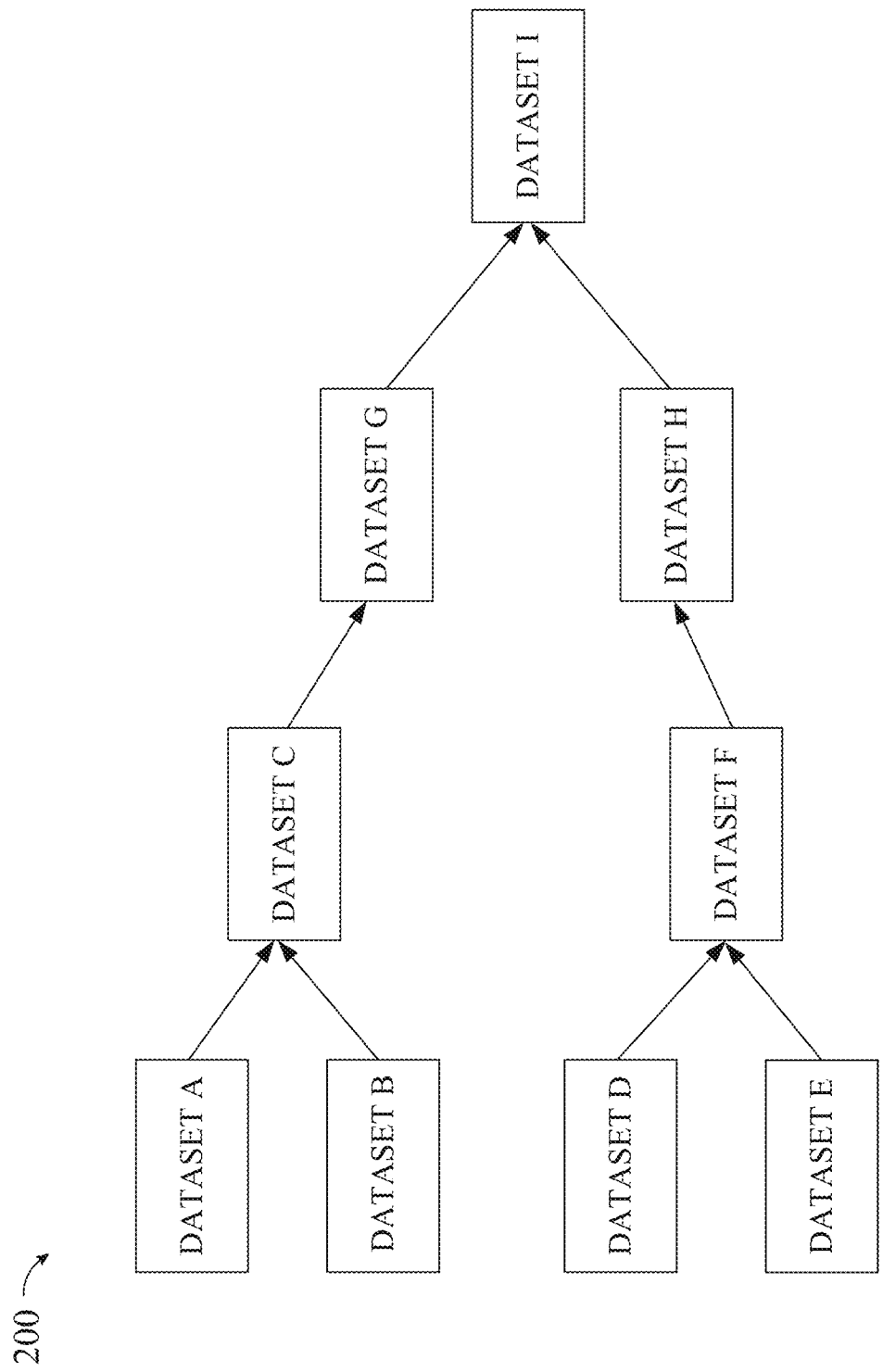
FIGS. 2A-2B depict another example data environment upon which aspects of this disclosure may be implemented.
Figure 2B:
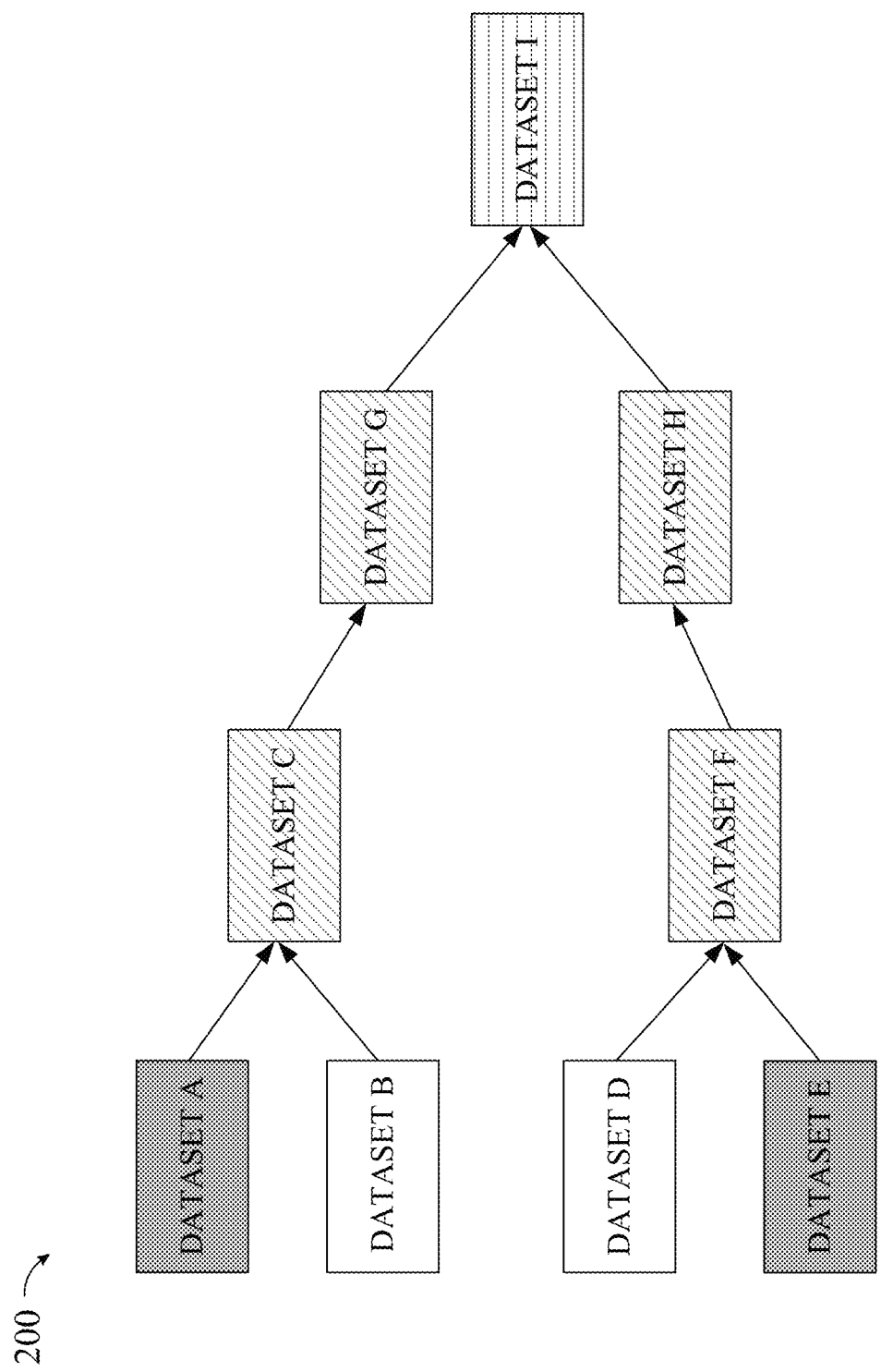

FIGS. 2A-2B depict an example data environment 200 which includes a few more layers of dependency than the data environment 100 of FIG. 1. The environment 200 includes Datasets A, B, C, D, E, F, G, H and I. In the environment 200, Dataset C depends on Datasets A and B, while Dataset F depends on Datasets D and E. In turn, Dataset G depends on Dataset C, while Dataset H depends from Dataset F. The last dataset which is Dataset I depends on both Datasets G and H. Thus, environment 200 involves three levels of dependency which include direct as well as indirect dependencies. These include Dataset I being directly dependent on Datasets G and H, and indirectly dependent on Datasets C and F, which themselves are directly dependent on Datasets A and B, as well as D and E, making Dataset I dependent on all Datasets A through H. Dependencies also include Dataset G being directly dependent on Dataset C and indirectly dependent on Datasets A and G. Moreover, environment 200 includes Dataset H being directly dependent on Dataset F and indirectly dependent on Datasets D and E.

With these three levels of dependency, identifying datasets that require restatement in the environment 200 becomes more complex than the environment 100. FIG. 2B illustrates how restatement of Datasets A and B may necessitate restatement of other datasets in the environment 200. In the environment 200 of FIG. 2B, solid gray datasets represent datasets that require restatement because of an issue (e.g., error, incorrect data, update to date, and the like), vertically striped datasets represent datasets that require restatements because of dependency in one branch of the dependency tree, and horizontally stripped datasets represent datasets that require restatements based on more than one branch of the dependency tree. Thus, Datasets A and E of FIG. 2B are datasets that have been determined as requiring restatement (e.g., by an engineering team, as a result of an automated test, or the like) because of an issue in the dataset. The restatement of Datasets A and E results in each of the Datasets C through I also requiring restatements. Datasets C and G may need restatement because of the restatement of Dataset A, while Datasets F and H may require restatement as a result of restatement of Dataset E. Dataset I, however, may require restatement because of restatements of both Datasets A and E, which result in restatements of Datasets G and H.

When creating a restatement operation plan, it may be important to consider the levels of dependency of each dataset to sequence the operation in the correct order. That is because to ensure accuracy of results, restatement of each dataset may need to be delayed until restatement of the previous dataset has been completed. For example, it is not appropriate to begin restatement of Dataset C until Dataset A has been completely restated. Similarly, Dataset G may not be restated until restatement of Dataset C is complete. The same is true for each of the Datasets F and H. Applying the same logic for Dataset I means that Dataset I should not be restated until both Datasets G and H have been completely restated. This is important because if Dataset I is restated after Dataset G has been restated, it may need to be restated again once Dataset H is restated. That may lead to multiple restatements of the same dataset, thus resulting in inefficient use of time and computing resources. To address this technical problem, the instant disclosure provides a technical solution that evaluates overlapping dependencies and optimizes the restatement operation to avoid restating datasets more than once.

Another complexity in identifying datasets requiring restatement and creating an optimized restatement plan is taking into account time dependency of data. Datasets are often created based on a schedule. For example, a first dataset may be created every day, while another dataset is created once a week. Moreover, different datasets may consume data from different time windows of an upstream dataset. In an example, each of Datasets G, H and I are created once a day. However, Dataset I consumes data from the last 30 days of each of Datasets G and H to generate its data. In this example, even if only one day of data is restated for Datasets G and H, 30 days of data may need to be restated for Dataset I, as each day Dataset I consumes the last 30 days of data of Datasets G and H. This challenge substantially increases the complexity of restatements, as not only datasets requiring restatement need to be identified based on complex dependencies, but it is also necessary to understand what time windows of data each dataset consumes across the different dependencies.

In complex data environments, different datasets may be used for a variety of different computing tasks. Often these tasks are managed by different engineering groups. As a result, a variety of different engineering teams may be responsible for different parts of the data environment. While different tasks and datasets may be assigned to different groups, however, it is common for data from a dataset managed by one group to be consumed by a dataset managed by a different group. This results in interdependency of data among different engineering teams. It may also mean that no engineering team is aware of all the dependencies of the data environment.

Figure 3:
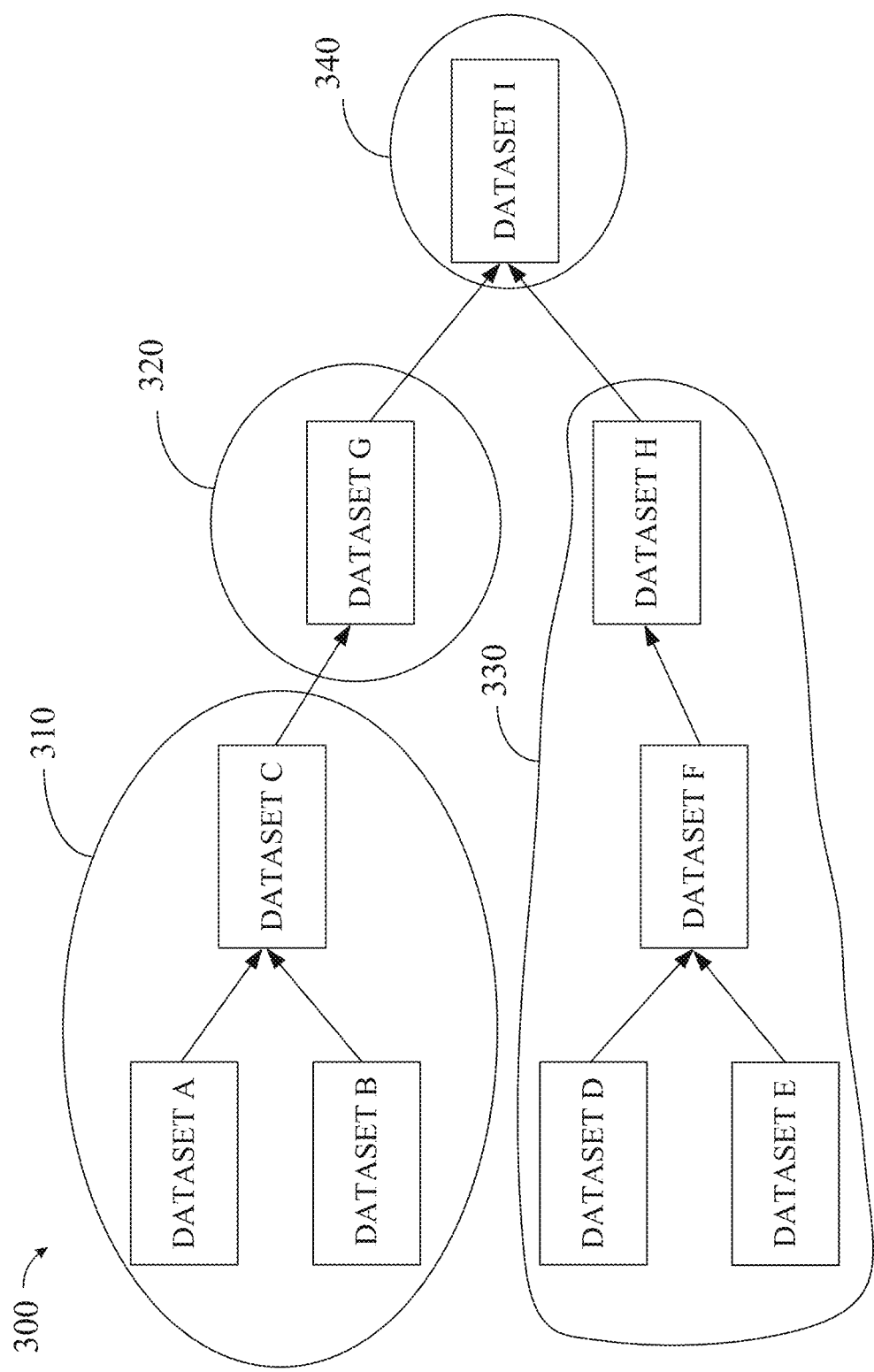
FIG. 3 depicts an example data environment in which different engineering teams are responsible for managing different datasets.

FIG. 3 depicts an example data environment 300 in which different engineering teams are responsible for managing different datasets. In the data environment 300, the datasets are divided into four different dataset groups 310, 320, 330 and 340. Dataset group 310 includes Datasets A, B and C, while Dataset group 320 only includes Dataset G and Dataset group 340 only includes Dataset I. Dataset group 330, on the other hand, includes Datasets D, E, F and H. Each of the different dataset groups 310, 320, 330 and 340 may be managed by a different engineering team. The engineering teams may not be aware of dataset dependencies of datasets managed by other teams. Thus, while the engineering team that is responsible for dataset group 310 may be informed that Dataset C depends on Datasets A and B, they may not be aware that Dataset G depends on Dataset C. Thus, when Dataset A is restated, the engineering team may be able to determine that Dataset C also needs to be restated, but they will not be aware of Datasets G and I that are in dataset groups 320 and 340. This makes restating a data environment correctly even more difficult and time consuming, as engineering teams may have to reach out to other teams to let them know of a restatement, every time one occurs.

These examples illustrate that even in very simplified data environments such as data environments 200 and 300, determining dependencies of various datasets for creating a restatement can become very complex. Real life data environments often include hundreds if not thousands of different datasets with complex dependencies and interdependencies. Identifying the lineage of a given dataset in such a system can become extremely difficult, time consuming and error-prone for a human being to perform. Furthermore, dependencies of datasets may sometimes change during the time it takes a human to identify the lineage, thus making the entire or part of the lineage incorrect. Because of the complexities involved and because dependencies may change during the time it takes a person to determine the lineage, identifying the lineage of datasets for determining restatements in complex environments is beyond the ability of humans. Yet, without identifying the full lineage of every dataset in the system and determining how they relate with each other in terms of their timing, it is not possible to accurately and reliably restate required datasets. The present disclosure addresses these technical problems by providing an efficient and accurate mechanism for automatically providing an optimized restatement plan.

Figure 4:
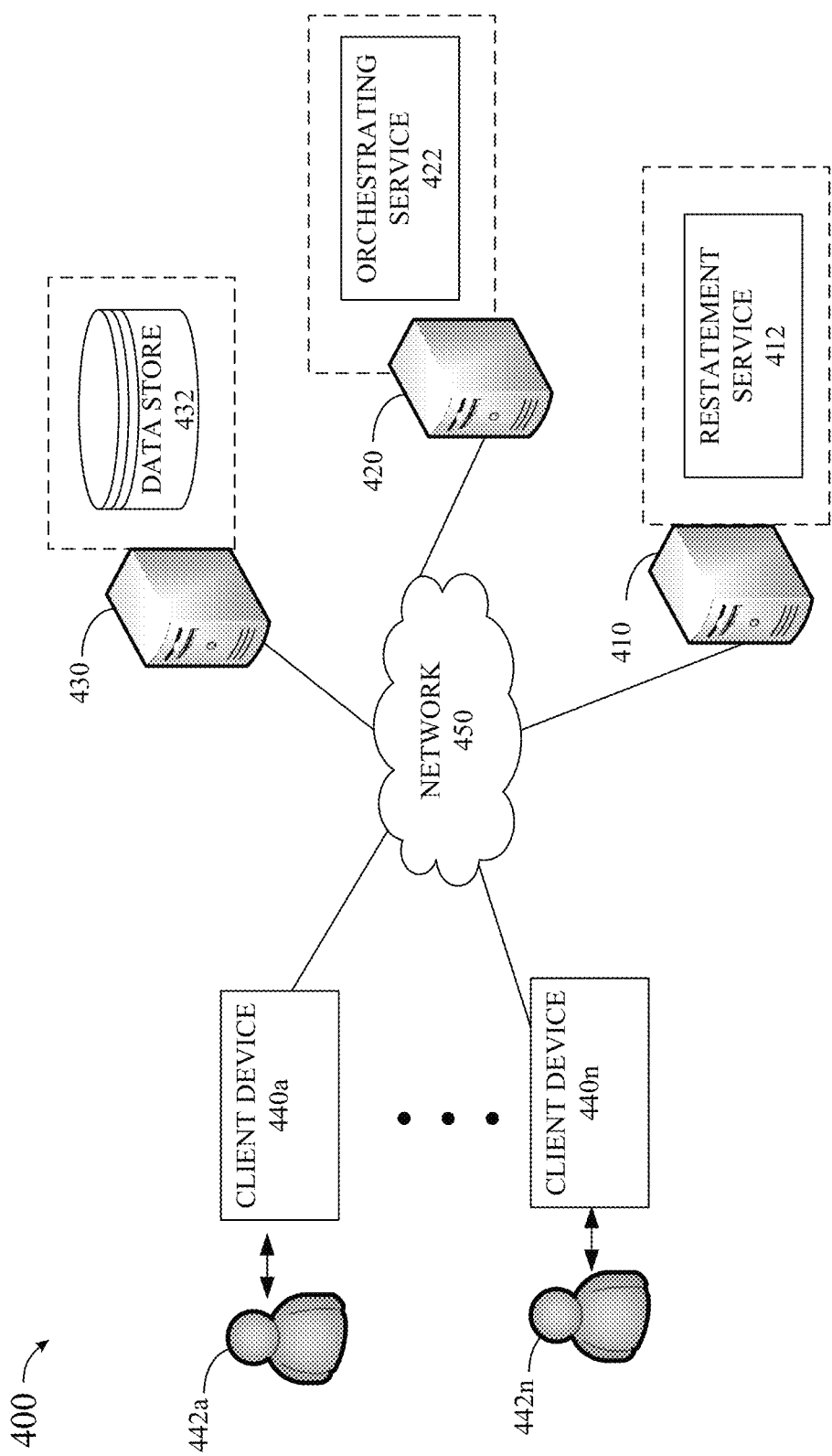
FIG. 4 depicts a system upon which aspects of this disclosure may be implemented.

FIG. 4 depicts an example system upon which aspects of this disclosure may be implemented. In different implementations, the system 400 may include a restatement server 410, an orchestrator server 420 and a storage server 430. The restatement server 410 may include and/or execute a restatement service 412, while the orchestrator server 420 may include and/or execute an orchestrating service 422. The storage server 430, on the other hand, may include a data store 432. The data store 432 may function as a repository in which multiple datasets may be stored. Each of the servers 410, 420, and 430 may operate as shared resource servers located at an enterprise accessible by various computer client devices such as client devices 440a through 440n. Each of the servers 410, 420, and 430 may also operate as cloud-based servers for offering global orchestrating, restatement and storage service, respectively. Although shown as one server, each of the servers 410, 420, and 430 may represent multiple servers for performing various different operations. For example, the server 420 may include one or more processing servers for performing different orchestrating operations. In another example, the storage server 430 may include or represent multiple storage servers, each having one or more data stores for storing data. Furthermore, although shown as separate servers, two or more of the servers 410, 420, and 430 may be combined into one server. For example, the servers 420 and 410 may be combined such that orchestrating and restatement services 422 and 412 are offered by the same server.

The restatement service 412 offered by the restatement server 410 may provide intelligent automatic restatement of data in a data environment such as data stored in the data store 432. As such, the restatement service 412 may be responsible for managing the restatement process. In some implementations, the restatement service 412 is a tool offered to users via which they can initiate a restatement operation, review the status of restatement operations, and the like. For example, the restatement service 412 may provide a user interface screen via which the user can submit a request for restating a particular dataset in a data environment. Furthermore, the restatement service 412 may automatically determine a need for initiating a restatement operation. For example, the restatement service 412 may receive an indication from a monitoring service (not shown) that a dataset has failed or that a specific time window of the dataset contains errors. The restatement service 412 may then determine based on the type of failure, duration of the failure, engineering ream responsible for the failed dataset and/or other factors that a restatement of the dataset for a given time window is required. Alternatively, the monitoring service or another tool may make the determination that a restatement is needed and submit a request to the restatement service 412 to begin the restatement process.

Once a request for restating a given dataset has been received or a determination that the dataset needs restatement has been made, the restatement service 412 may examine the dependencies of the given dataset to automatically identify other datasets that need to be restated as a result. This may be achieved by retrieving a list of one or more datasets in the data environment. In an example, this is performed by submitting a request to the orchestrating service 422 to transmit a list of all datasets in the data environment.

After the list of datasets in the data environment has been retrieved, the restatement service may access data relating to the dependencies of the datasets in the data environment. This data may be stored as metadata that represents each dataset. In some implementations, a metadata file stores metadata relating to one or more datasets. The metadata may include inputs (e.g., raw data streams) provided to a software code that generates the dataset, the time window of inputs required to generate a given output, outputs of the software code, the events performed to generate the output, the schema for the dataset, the frequency with which the dataset is generated (e.g., once a day), and the like. The metadata may be generated by examining the software codes that generate each dataset and maybe updated continuously as changes to the datasets occur. The metadata may be generated by the orchestrating service 422 and/or by the restatement service 412. Furthermore, the metadata may be stored with each dataset, for example, in the data store 432.

Alternatively, and/or additionally, the metadata may be stored locally in the restatement server 410 and/or in the orchestrator server 420.

Once the metadata has been accessed, the restatement service 412 may examine the inputs and outputs of each dataset in the data environment to automatically generate a dependency tree for the dataset for which a restatement request was received. By examining all data streams used for generating each dataset, the restatement service 412 may be able to identify direct dependencies for a given dataset. Once direct dependencies are identified, that information may be used to identify indirect dependencies. For example, referring to the data environment 200 of FIGS. 2A-2B, once it is determined that Dataset I is dependent on Dataset H and Dataset H is dependent on Dataset F, an inference is made that Dataset I is also dependent on Dataset F. In some implementations, the dependency tree is generated as a dependency graph. In some implementations, the restatement service 412 maintains a database of lineage information for one or more datasets in the system 400 such that at any given time, the lineage information for those datasets is available and up to date.

In some implementations, in generating the dependency tree, care is taken to examine the time windows of raw data consumed by each dataset as well as the frequency with which the datasets are generated, and/or the dates/times on which they are generated to ensure only datasets that are affected by the primary dataset are included in the dependency tree. For example, if today's date is Mar. 23, 2021, Dataset C of FIG. 2A is being restated for Mar. 22, 2021, and Dataset C is generated once a day, while Dataset G is generated once a month at the end of the month and consumes the previous 30 days of data from Dataset C, Dataset G does not need to be restated. That is because, even though, Dataset G is generally dependent on Dataset C, because of the time difference between when Datasets C and G are generated and the time window of data Dataset G consumes, it is not affected by the current restatement. This assumes that by the time Dataset G needs to be generated on Mar. 31, 2021, restatement of Dataset C for Mar. 22, 2021 has been completed. To ensure that is the case, the restatement service 412 and/or the orchestrating service 422 may keep track of when restatement of datasets have been completed and determine if other datasets may have been affected because of the time it took to restate one or more datasets. Thus, as dependencies are calculated, the restatement service 412 examines the time/date on which the primary database is restated and calculates how the particular time window of the restated dataset affects other datasets in the dependency tree.

Once the dependency tree has been generated, the restatement service 412 may examine the dependency tree to identify datasets in the dependency tree that are affected by the restated dataset. As discussed above, this may involve examining the time window of restated data to analyze which datasets are affected by this time window of data. When there is an overlap between a time window of data an upstream dataset uses as an input and restated data in a downstream dataset, the upstream data is determined as requiring restatement. The determination may be propagated in the entire data environment such that effects of all dataset restatements are examined and considered. This means once a dataset is indicated as requiring restatement, its upstream datasets may be examined to determine if they are affected and as such also require restatement.

After datasets requiring restatement are identified by the restatement service 412, information regarding those datasets may be transmitted to the orchestrating service 422. The information may include the identified datasets, their dependency tree, and/or the time windows of data affected. In some implementations, only the dependency tree is transmitted to the orchestrator. The orchestrator may then identify the time element of the calculations by itself.

The orchestrating service 422 may function as a data orchestrator responsible for managing, organizing, combining and/or transforming data that is stored in one or more data storage locations. To provide automatic restatement of data, the orchestrating service 422 may also be responsible for managing the restatement process. As such, the orchestrating service 422, may provide intelligent execution of the restatement process. This may involve receiving the identified datasets, dependency tree and/or affected time windows and creating an optimized restatement plan for the restating the required datasets. In some implementations, the restatement plan is generated by the restatement service 412 and transmitted to the orchestrating service 422 for execution.

The optimized restatement plan may include an appropriate sequencing of events such that restatement occurs in an appropriate order. For example, for the data environment 200 of FIG. 2B, this may involve a restatement plan that provides for restating Dataset C, after restatement of Dataset A is completed and restating Dataset F, once restatement of Dataset E has finished. Similarly, the plan would provide for restating Dataset G, after restatement of Dataset C has been done and restating Dataset H, once restatement of Dataset F has completed. For Dataset I, the plan would provide a sequencing of events, such that restatement of I only occurs once restatement of both Datasets G and H has been completed. This ensures that the restatement operation produces accurate datasets and is performed in an optimal manner that does not involve multiple restatements of the same dataset.

Once the restatement plan has been generated, the orchestrating service 422 may initiate execution of the restatement plan. This may involve regenerating data for each of the datasets in the restatement plan in the order provided. To regenerate the data, the software code executed for producing each dataset may be executed. This may be done by the orchestrating service 422. Alternatively, the orchestrating service 422 may transmit a request to a server responsible for executing the software code. Once regenerating the data of a dataset is complete, an indication may be received by the orchestration service 422, which may in turn, initiate regeneration of the next dataset in the restatement plan.

In some implementations, the restatement plan may be transmitted to the restatement service 412 which may make the restatement plan available for viewing by one or more users such as users 442a through 442n via a client device such as client devices 440a to 440n. Alternatively, and/or additionally, once execution of the restatement plan has been completed, a notification may be transmitted to the user initiating the restatement (e.g., the engineering team member who submitted the request for the initial restatement). In some implementations, notification is transmitted to engineering teams responsible for one or more of the restated datasets such that they are aware of the recent changes to their datasets. The notification may include a list of one or more of the restated datasets. The notifications may be transmitted from the restatement service 412 and/or orchestrating service 422 to one or more of the client devices 440a to 440n.

The client devices 440a to 440n may include any stationary or mobile computing devices configured to provide a user interface for interaction with a user 442a to 442n and/or configured to communicate via the network 450. For example, the client devices may include workstations, desktops, laptops, tablets, smart phones, cellular phones, personal data assistants (PDA), printers, scanners, telephone, or any other device that can be used to interact with the users 442a to 442n. The client devices 440a to 440n may be representative of client devices used by engineering team members (e.g., users 442a to 442n) in a system 400 to monitor, maintain and manage various datasets and/or system components.

It should be noted that although shown as two different services, the restatement service 412 and the orchestrating service 422 may be combined into one service. Furthermore, one or more of the functions discussed here as being performed by the restatement service 412 may be performed by the orchestrating service 422, and vice versa.

Various elements of the system 400 may be connected to each other via the network 450. For example, each of the servers 410, 420, and 430 may be connected to one another via the network 450. Similarly, the client devices 440a through 440n may be connected to the orchestrating server 410 and/or restatement server 420 via the network 450. The network 450 may be a wired or wireless network or a combination of wired and wireless networks.

Figure 5:
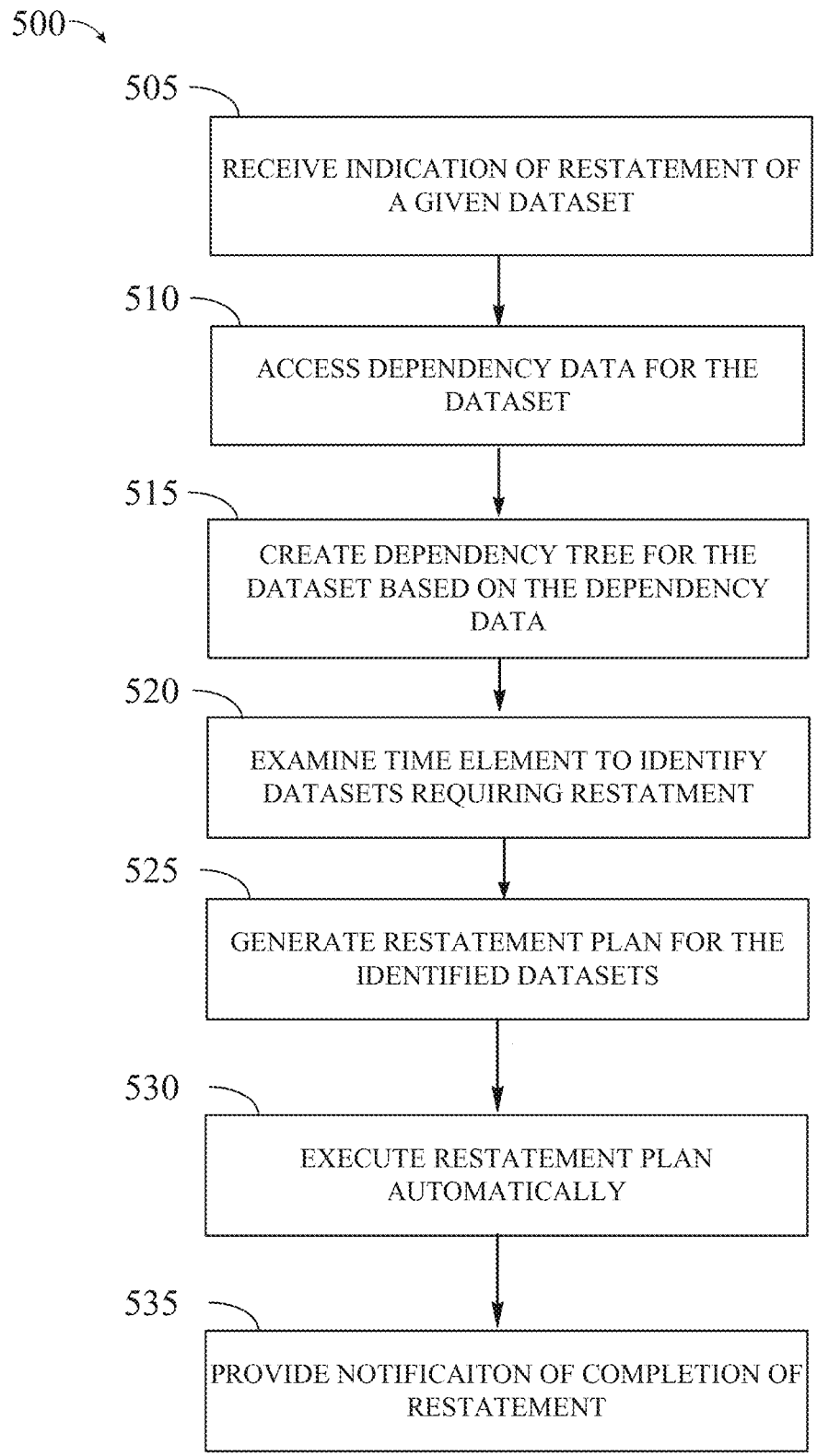
FIG. 5 is a flow diagram showing an example method for automatic restatement of data based on data dependencies.

FIG. 5 is a flow diagram depicting an example method 500 for providing automatic restatement of data in a data environment based on data dependency. In an example, one or more steps of method 500 may be performed by a restatement server (e.g., restatement server 410 of FIG. 4) or orchestrating server (e.g., orchestrating server 420 of FIG. 4). Other steps of method 500 may be performed by a storage server (e.g., storage server 430 of FIG. 2).

At 505, the method 500 may begin by receiving an indication that a given dataset in a data environment was recently restated, is being currently or needs to be restated in the near future. The indication may be received when a user, such as an engineering team member responsible for managing a dataset transmits a request for restating a given dataset or schedules an upcoming restatement for a given dataset. This may be done via a user interface screen of a restatement tool or another software program for managing data. Alternatively, the indication may be received via a software program such as a maintenance or testing program, when it is determined that a dataset is erroneous or has failed. In some implementations, once an indication is received (e.g., from another software program or from a user) that a given dataset includes erroneous data or has failed, the method 500 may automatically identify the portion of data in the dataset that requires restatement.

After receiving the indication of restatement of the given dataset, method 500 may proceed to access dependency data for the given dataset, at 510. This may involve accessing metadata for one of more datasets in the data environment and may include transmitting a request to receive the metadata and receiving the metadata in response. The metadata may include identification of the input data streams used by each dataset in the environment and/or the time windows for the input data streams used. The dependency of each dataset in the data environment may be calculated based on this metadata.

Once the metadata has been accessed, method 500 may create a dependency tree for the given dataset based on the dependency data, at 515. This may involve utilizing the dependency data and/or the metadata to identify all the upstream datasets that directly or indirectly depend on the dataset at issue. After the upstream datasets are identified, a dependency tree (e.g., a dependency graph) that illustrated the relationship between the upstream datasets and the dataset at issue may be created.

When upstream datasets are identified and/or a dependency tree is created, method 500 may proceed to examine a time element relating to the identified datasets and the given dataset (i.e., the dataset for which indication of restatement was received) to identify datasets that may require restatement, at 520. The time element may include the time/date on which the given dataset was restated or is being restated, the time window of data for which the given dataset is being restated, the frequency with which each of the identified datasets are generated, the time windows of data the identified datasets consume, and/or the time/date at which each identified dataset will be generated next. This timing information may be used to identify the time windows of data in each dataset that are affected by the restatement of the given dataset. This helps clarify which datasets are actually affected by the restated dataset and for which time/dates.

Once the identified datasets and their affected time windows are determined, method 500 may proceed to generate an optimized restatement plan for the affected datasets, at 525. This may involve examining the dependency tree, identifying the dataset that would first need to be restated from among the upstream datasets, and/or determining what time window the dataset needs to be restated for. The process may be repeated for other datasets in the list of identified datasets to create a sequence of events that may need to occur for optimal restatement of the data environment. As such, the restatement plan may include previous restatements that need to be completed in order for each new restatement in the restatement plan to begin. In an example, when a dataset is dependent on two different branches of downstream datasets, this means waiting for restatement of both branches to be completed before the beginning to restate the dataset.

After the optimized restatement plan has been generated, method 500 may proceed to execute the restatement plan automatically, at 530. This may involve invoking performance of each event in the restatement plan in order. In an example, this includes sending a request to a software code to regenerate data of a given dataset for a determined time window, waiting to receive confirmation that the regeneration has been completed and then proceeding to send a request for regeneration of data in the next dataset of the restatement plan.

Once the restatement plan is fully executed, method 500 may proceed to provide a notification to one or more engineering teams, at 535. This may include sending a notification to the user who requested the initial restatement. Furthermore, it may include providing a notification to engineering teams that are responsible for one or more of the restated datasets. The notification may include information about the restated dataset, the time/date restatement was performed, and/or the time window for which restatement was performed. This may enable the engineering teams to stay aware of changes to their datasets. Furthermore, it may provide the initial user confirmation that their requested restatement has been completed. The notification may involve sending a message (e.g., an email message or an instant message) to one or more engineering team members. In another example, the notification may involve updating a user interface screen of a data management application (e.g., restatement tool) with information about completion of a restatement process.

Figure 6:
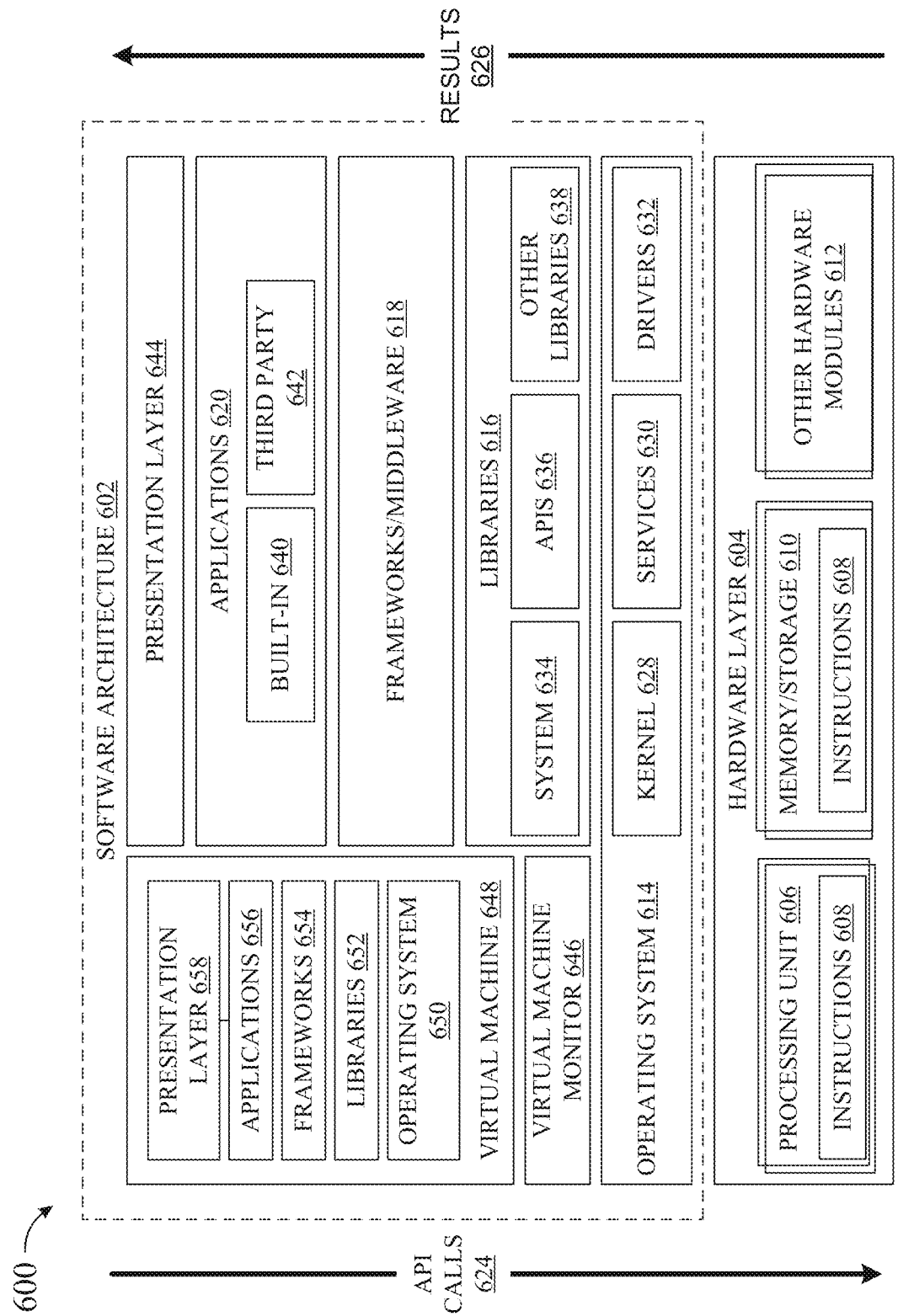
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
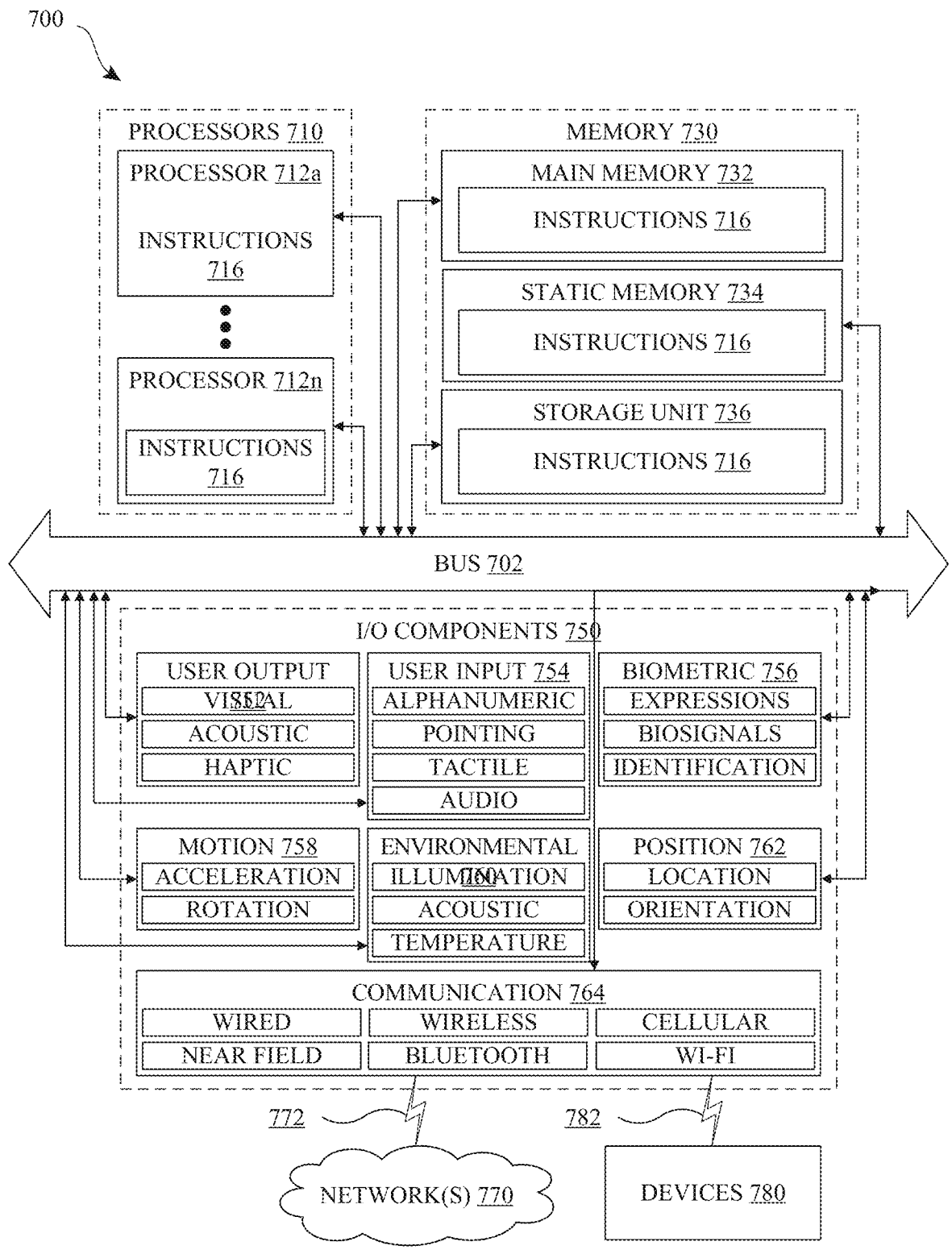
FIG. 7 is a block diagram illustrating components of an example machine configured to read instructions from a machine-readable medium and perform any of the features described herein.

FIG. 7 is a block diagram showing components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving, by a restatement server, a request for a restatement of a first dataset, the first dataset being a part of a data environment that includes a plurality of datasets, at least one of the plurality of datasets being dependent on one or more additional datasets in the data environment;
accessing dependency data that describes a set of dependencies between the first dataset and one or more other datasets in the data environment, the dependency data including metadata associated with one or more of the plurality of datasets;
analyzing the dependency data to automatically identify one or more second datasets from among the one or more other datasets, the one or more second datasets being datasets which depend from the first dataset;
examining a first timing data related to the restatement of the first dataset and a second timing data related to the identified one or more second datasets to identify one or more third datasets that require restatement as a result of the restatement of the first dataset, the one or more third datasets being from among the one or more second datasets;
generating a restatement plan based on at least a dependency relationship between the identified one or more third datasets; and
initiating automatic execution of the restatement plan.

Item 2. The data processing system of item 1, wherein the metadata includes information about one or more input data streams used to generate one or more datasets of the data environment.

Item 3. The data processing system of items 1 or 2, wherein the memory further stores executable instructions that, when executed by the processor, cause the data processing system to perform a function of automatically creating a dependency tree for the first dataset, the dependency tree being created based on the dependency data.

Item 4. The data processing system of any preceding item, wherein:
the first timing data includes at least one of a time of restatement of the first dataset and a first time window of data within the first dataset being affected by the restatement, and
the second timing data includes at least one of a frequency at which each of the identified one or more second datasets are created, and a second time window of data used to generate each of the identified one or more second datasets.

Item 5. The data processing system of any preceding item, wherein the restatement plan includes a sequencing order for restating the identified one or more third datasets.

Item 6. The data processing system of item 5, wherein the order ensures each of the identified one or more third datasets are restated no more than once during the execution of the restatement plan.

Item 7. The data processing system of any preceding item, wherein the request is received from a user.

Item 8. A method for providing automatic restatement of a data environment comprising:
receiving, by a restatement server, a request for a restatement of a first dataset, the first dataset being a part of the data environment that includes a plurality of datasets, at least one of the plurality of datasets being dependent on one or more additional datasets in the data environment;
accessing dependency data that describes a set of dependencies between the first dataset and one or more other datasets in the data environment, the dependency data including metadata associated with one or more of the plurality of datasets;
analyzing the dependency data to automatically identify one or more second datasets from among the one or more other datasets, the one or more second datasets being datasets which depend from the first dataset;
examining a first timing data related to the restatement of the first dataset and a second timing data related to the identified one or more second datasets to identify one or more third datasets that require restatement as a result of the restatement of the first dataset, the one or more third datasets being from among the one or more second datasets;

generating a restatement plan based on at least a dependency relationship between the identified one or more third datasets; and initiating automatic execution of the restatement plan.

Item 9. The method of item 8, wherein the dependency data includes metadata about one or more data streams used to generate one or more datasets of the data environment.

Item 10. The method of items 8 or 9, further comprising automatically creating a dependency tree for the first dataset, the dependency tree being created based on the dependency data.

Item 11. The method of any of items 8-10, wherein:

the first timing data includes at least one of a time of restatement of the first dataset and a first time window of data within the first dataset being affected by the restatement, and the second timing data includes at least one of a frequency at which each of the identified one or more second datasets are created, and a second time window of data used to generate each of the identified one or more second datasets.

Item 12. The method of any of items 8-11, wherein the restatement plan includes a sequencing order for restating the identified one or more third datasets.

Item 13. The method of item 12, wherein the order ensures each of the identified one or more third datasets are restated no more than once during the execution of the restatement plan.

Item 14. A non-transitory computer readable medium on which are stored instructions that when executed cause a programmable device to:

receive, by a restatement server, a request for a restatement of a first dataset, the first dataset being a part of a data environment that includes a plurality of datasets, at least one of the plurality of datasets being dependent on one or more additional datasets in the data environment;

access dependency data that describes a set of dependencies between the first dataset and one or more other datasets in the data environment, the dependency data including metadata associated with one or more of the plurality of datasets;

analyze the dependency data to automatically identify one or more second datasets from among the one or more other datasets, the one or more second datasets being datasets which depend from the first dataset;

examine a first timing data related to the restatement of the first dataset and a second timing data related to the identified one or more second datasets to identify one or more third datasets that require restatement as a result of the restatement of the first dataset, the one or more third datasets being from among the one or more second datasets;

generate a restatement plan based on at least a dependency relationship between the identified one or more third datasets; and initiate automatic execution of the restatement plan.

Item 15. The non-transitory computer readable medium of item 14, wherein the dependency data includes metadata about one or more data streams used to generate one or more datasets of the data environment.

Item 16. The non-transitory computer readable medium of items 14 or 15, wherein the instructions further cause the programmable device to perform a function of automatically creating a dependency tree for the first dataset, the dependency tree being created based on the dependency data.

Item 17. The non-transitory computer readable medium of any of items 14-16, wherein:

the first timing data includes at least one of a time of restatement of the first dataset and a first time window of data within the first dataset being affected by the restatement, and the second timing data includes at least one of a frequency at which each of the identified one or more second datasets are created, and a second time window of data used to generate each of the identified one or more second datasets.

Item 18. The non-transitory computer readable medium of any of items 14-17, wherein the restatement plan includes a sequencing order for restating the identified one or more third datasets.

Item 19. The non-transitory computer readable medium of item 18, wherein the order ensures each of the identified one or more third datasets are restated no more than once during the execution of the restatement plan.

Item 20. The non-transitory computer readable medium of any of items 14-19, wherein the instructions further cause the programmable device to provide notification to a user of completion of the restatement plan.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving, by a restatement server, a request for a restatement of a first dataset, the first dataset being a part of a data environment that includes a plurality of datasets, at least one of the plurality of datasets being dependent on one or more additional datasets in the data environment;
accessing dependency data that describes a set of dependencies between the first dataset and one or more other datasets in the data environment, the dependency data including metadata associated with one or more of the plurality of datasets;
analyzing the dependency data to automatically identify one or more second datasets from among the one or more other datasets, the one or more second datasets being datasets which depend from the first dataset;
examining a first timing data related to the restatement of the first dataset and a second timing data related to the identified one or more second datasets to identify one or more third datasets that require restatement as a result of the restatement of the first dataset, the one or more third datasets being from among the one or more second datasets;
generating a restatement plan based on at least a dependency relationship between the identified one or more third datasets; and
initiating automatic execution of the restatement plan, wherein:
the first timing data includes a first time window of data for which the first dataset is being restated, and
the second timing data includes a frequency with which each of the one or more second datasets are generated and a second time window of data from the first dataset that each of the one or more second datasets consumes.

2. The data processing system of claim 1, wherein the metadata includes information about one or more input data streams used to generate one or more datasets of the data environment.

3. The data processing system of claim 1, wherein the memory further stores executable instructions that, when executed by the processor, cause the data processing system to perform a function of automatically creating a dependency tree for the first dataset, the dependency tree being created based on the dependency data.

4. The data processing system of claim 1, wherein:
the first timing data includes at least one of a time of restatement of the first dataset and a first time window of data within the first dataset being affected by the restatement, and
the second timing data includes at least one of a frequency at which each of the identified one or more second datasets are created, and a second time window of data used to generate each of the identified one or more second datasets.

5. The data processing system of claim 1, wherein the restatement plan includes a sequencing order for restating the identified one or more third datasets.

6. The data processing system of claim 5, wherein the order ensures each of the identified one or more third datasets are restated no more than once during the execution of the restatement plan.

7. The data processing system of claim 1, wherein the request is received from a user.

8. A method for providing automatic restatement of a data environment comprising:
receiving, by a restatement server, a request for a restatement of a first dataset, the first dataset being a part of the data environment that includes a plurality of datasets, at least one of the plurality of datasets being dependent on one or more additional datasets in the data environment;
accessing dependency data that describes a set of dependencies between the first dataset and one or more other datasets in the data environment, the dependency data including metadata associated with one or more of the plurality of datasets;
analyzing the dependency data to automatically identify one or more second datasets from among the one or more other datasets, the one or more second datasets being datasets which depend from the first dataset;
examining a first timing data related to the restatement of the first dataset and a second timing data related to the identified one or more second datasets to identify one or more third datasets that require restatement as a result of the restatement of the first dataset, the one or more third datasets being from among the one or more second datasets;
generating a restatement plan based on at least a dependency relationship between the identified one or more third datasets; and
initiating automatic execution of the restatement plan wherein:
the first timing data includes a first time window of data for which the first dataset is being restated, and
the second timing data includes a frequency with which each of the one or more second datasets are generated and a second time window of data from the first dataset that each of the one or more second datasets consumes.

9. The method of claim 8, wherein the dependency data includes metadata about one or more data streams used to generate one or more datasets of the data environment.

10. The method of claim 8, further comprising automatically creating a dependency tree for the first dataset, the dependency tree being created based on the dependency data.

11. The method of claim 8, wherein:
the first timing data includes at least one of a time of restatement of the first dataset and a first time window of data within the first dataset being affected by the restatement, and
the second timing data includes at least one of a frequency at which each of the identified one or more second datasets are created, and a second time window of data used to generate each of the identified one or more second datasets.

12. The method of claim 8, wherein the restatement plan includes a sequencing order for restating the identified one or more third datasets.

13. The method of claim 12, wherein the order ensures each of the identified one or more third datasets are restated no more than once during the execution of the restatement plan.

14. A non-transitory machine-readable medium on which are stored instructions that when executed cause a programmable device to:
receive, by a restatement server, a request for a restatement of a first dataset, the first dataset being a part of a data environment that includes a plurality of datasets, at least one of the plurality of datasets being dependent on one or more additional datasets in the data environment;
access dependency data that describes a set of dependencies between the first dataset and one or more other datasets in the data environment, the dependency data including metadata associated with one or more of the plurality of datasets;
analyze the dependency data to automatically identify one or more second datasets from among the one or more other datasets, the one or more second datasets being datasets which depend from the first dataset;
examine a first timing data related to the restatement of the first dataset and a second timing data related to the identified one or more second datasets to identify one or more third datasets that require restatement as a result of the restatement of the first dataset, the one or more third datasets being from among the one or more second datasets;
generate a restatement plan based on at least a dependency relationship between the identified one or more third datasets; and
initiate automatic execution of the restatement plan
wherein:
the first timing data includes a first time window of data for which the first dataset is being restated, and
the second timing data includes a frequency with which each of the one or more second datasets are generated and a second time window of data from the first dataset that each of the one or more second datasets consumes.

15. The non-transitory machine-readable medium of claim 14, wherein the dependency data includes metadata about one or more data streams used to generate one or more datasets of the data environment.

16. The non-transitory machine-readable medium of claim 14, wherein the instructions further cause the programmable device to perform a function of automatically creating a dependency tree for the first dataset, the dependency tree being created based on the dependency data.

17. The non-transitory machine-readable medium of claim 14, wherein:
the first timing data includes at least one of a time of restatement of the first dataset and a first time window of data within the first dataset being affected by the restatement, and
the second timing data includes at least one of a frequency at which each of the identified one or more second datasets are created, and a second time window of data used to generate each of the identified one or more second datasets.

18. The machine-readable medium of claim 14, wherein the restatement plan includes a sequencing order for restating the identified one or more third datasets.

19. The machine-readable medium of claim 18, wherein the order ensures each of the identified one or more third datasets are restated no more than once during the execution of the restatement plan.

20. The machine-readable medium of claim 14, wherein the instructions further cause the programmable device to provide notification to a user of completion of the restatement plan.

* * * * *